United States Patent [19]
Inoue

[11] 3,879,129
[45] Apr. 22, 1975

[54] METHOD OF AND APPARATUS FOR MEASURING SIZE AND CONCENTRATION OF PARTICLES

[75] Inventor: Toshio Inoue, Tokyo, Japan

[73] Assignee: Ichiro Kato, President, University of Tokyo, Tokyo, Japan

[22] Filed: Sept. 6, 1972

[21] Appl. No.: 286,658

[30] Foreign Application Priority Data
Sept. 7, 1971 Japan.................................. 46-69169

[52] U.S. Cl.................. 356/102; 356/208; 250/564
[51] Int. Cl....................... G01n 15/02; G01n 21/06
[58] Field of Search........... 356/102, 103, 104, 199, 356/210, 208; 250/218 X, 564

[56] References Cited
UNITED STATES PATENTS
3,275,834  9/1966  Stevens............................. 356/102
3,713,743  1/1973  Simms............................... 356/208

*Primary Examiner*—John K. Corbin
*Assistant Examiner*—Conrad Clark
*Attorney, Agent, or Firm*—Sughrue, Rothwell, Mion, Zinn and Macpeak

[57] ABSTRACT

Method of and apparatus for measuring size and concentration of particles are disclosed wherein light rays are irradiated upon particles fluidly moving relative to a limited small space. The intensity of the penetrated or diffused light rays through the groups of particles changes in dependence with the particle size and concentration, and it can be represented by non-variable and variable components. The latter component comes from the statistical change of the number and spatial arrangement of the particles with respect to time. The non-variable and variable components of the intensity of the penetrated or diffused light rays are detected to measure the size and concentration of the particles.

2 Claims, 3 Drawing Figures

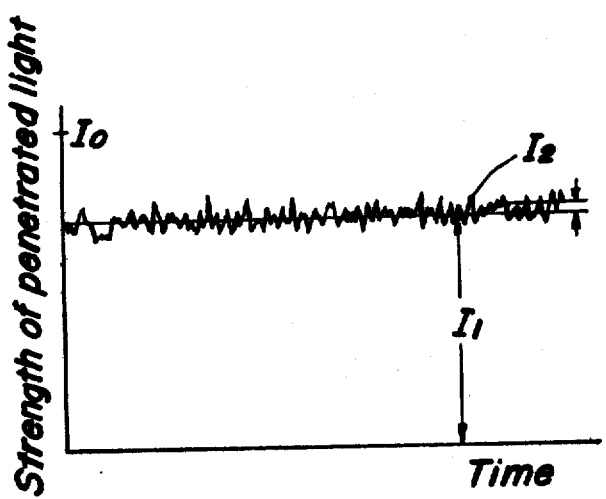
FIG_1

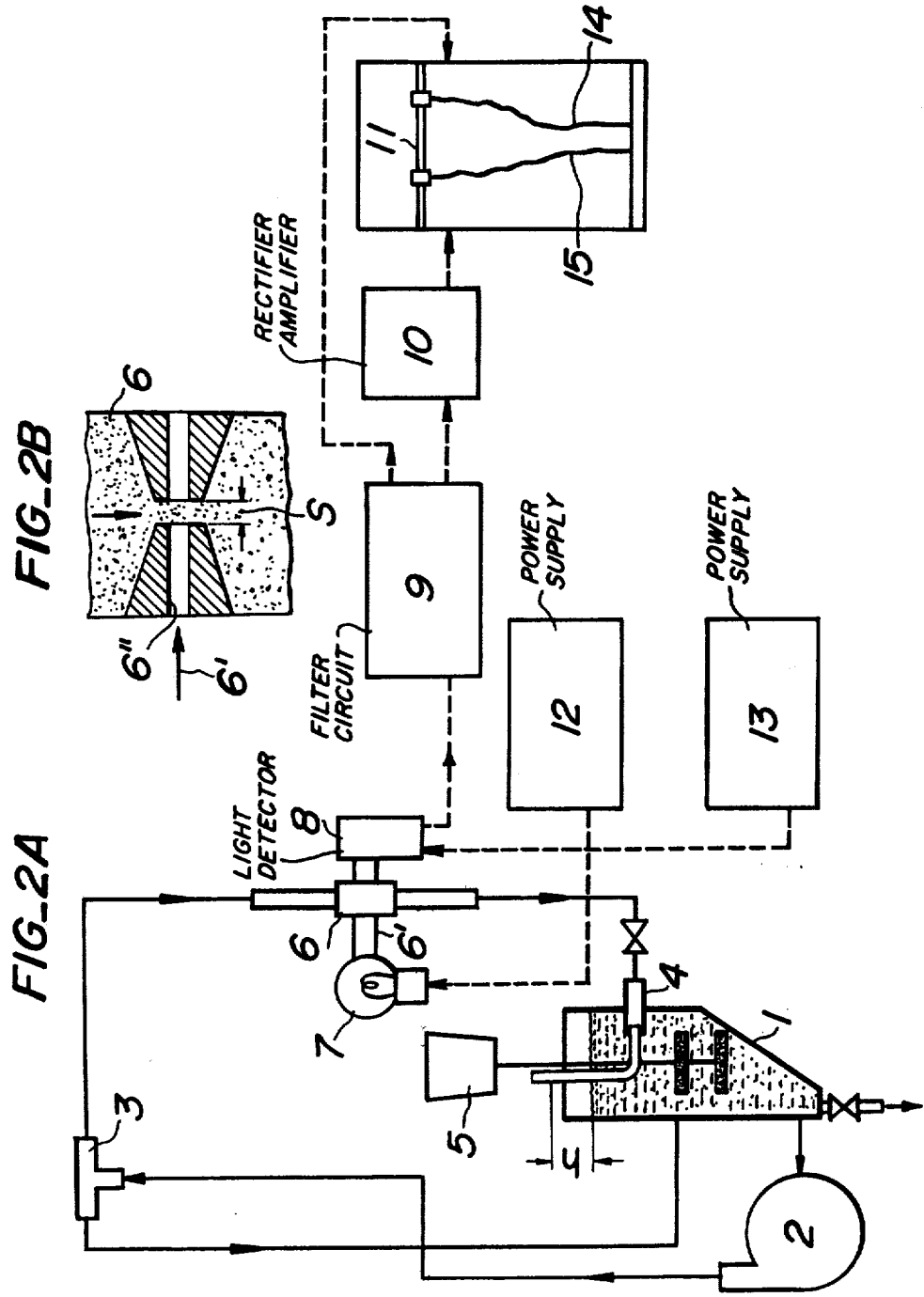

METHOD OF AND APPARATUS FOR MEASURING SIZE AND CONCENTRATION OF PARTICLES

BACKGROUND OF THE INVENTION

This invention relates to a method of and apparatus for measuring size and concentration of particles per se or particles recorded on a sensitive film. In the following, the term particle size shall be understood to denote numerical values directly or indirectly representing the size of particles constituting a group of particles such, for example, as average particle diameter, specific surface area, etc.

SUMMARY OF THE INVENTION

The object of the invention is to provide a method of measuring particle size and concentration of a group of particles, by which the particle size and concentration can be measured on the basis of the on-line system in a simple and rapid manner irrespective of the property of the group of particles and without distinction of dry and wet processes.

In this connection the merit of the invention is to provide an apparatus for carrying out the method which is simple in construction and reliable in operation especially for plant control purposes.

BRIEF DESCRIPTION OF THE DRAWING

The invention will now be described with reference to the annexed drawings, in which:

FIG. 1 shows curves for assisting in the description of the method according to the invention;

FIG. 2A is a schematic diagram of one embodiment of the apparatus according to the invention; and FIG. 2B is a diagrammatic enlarged cross-section through a measuring part shown in FIG. 2A.

DESCRIPTION OF PREFERRED EMBODIMENT

For ease of illustration, the invention will now be described with reference to the method of measuring the size and concentration of fine particles suspended in water and flowing through a pipe provided with a window irradiated by light rays.

In such method the intensity of the light rays penetrated through the particle suspension is influenced by the size, number and arrangement of the particles appearing in the window. Even if the particles appearing in the window are the same in size, the number and spacial arrangement of the particles change from time to time in dependence with the laws of probability, and as a result, the intensity of the penetrated light rays fluctuates with respect to a certain mean value.

Taking the above fact into consideration, the magnitude $I_1$ of the non-variable component of the intensity of the penetrated light rays is given by $$I_1 = f(x, \phi) \quad (1)$$

where $f$ is a functional symbol, $x$ is the particle size and $\phi$ is the particle concentration.

While, the magnitude $I_2$ of the variable component of the intensity of the penetrated light rays is also given by $$I_2 = g(x, \phi) \quad (2)$$

where $g$ is a functional symbol.

In FIG. 1 is diagrammatically shown the relation between the magnitude $I_1$ of the non-variable component and the magnitude $I_2$ of the variable component of the intensity of the penetrated light rays.

If the above mentioned factors $I_1$ and $I_2$ relating to the intensity of the penetrated light rays can be measured, it is possible to obtain from these measured results the solution of the above formulae 1 and 2 as simultaneous equations, thereby obtaining the particle size x and particle concentration $\phi$.

In the above method use may be made of $\beta$-rays instead of using light rays (visible light rays or other electromagnetic waves) and of diffused light rays instead of using penetrated light rays. The configuration of the measuring space and the mechanism for producing the relative movement of the measuring space with respect to the group of particles and the operating conditions may suitably be determined in dependence with the property of the particles. For example, the particles may be suspended in water or air and the thus suspended particles are caused to flow through a pipe or container and then light rays etc. are irradiated through a stationary measuring window. Alternatively, the particles may be adhered on a filter paper, sensitive film, etc. or the image of particles may be produced thereon. Then, these particles may be scanned by the light rays, etc.

In FIG. 2A is shown an apparatus for carrying out the method according to the invention, by which is measured the representative size of particles on the order of several microns to several hundred microns. In FIG. 2A, reference numeral 1 designates a water tank containing liquid in which is suspended particles to be measured and 2 illustrates a pump. A portion of the suspended liquid delivered from the pump 2 is supplied through a branch pipe 3 to a measuring part 6 as clearly shown in FIG. 2B. 4 designates a flow velocity measuring device and 5 shows an agitator. The light rays from a light source 7 enter through a pipe 6' and window 6'' into the measuring part 6 and then into a light detector 8 (such as a photoelectric multiplier tube). The electrical output from the light detector 8 is supplied to a filter circuit 9 adapted to separate the electrical output into a direct current component and an alternating current component. The direct current component thus separated by the filter circuit 9 is introduced as a first factor representing the magnitude of the non-variable component of the intensity of the penetrated light rays and corresponding to $I_1$ given by the formula 1 into a recorder 11. While, the alternating current component thus separated by the filter circuit 9 is introduced through a rectifier-amplifier 10 as a second factor representing the magnitude of the variable component of the intensity of the penetrated light rays and corresponding to $I_2$ given by the formula 2 into the recorder 11. 12 and 13 represent stabilized electrical power supply sources, respectively.

The values corresponding to the first and second factors $I_1$ and $I_2$ are recorded on a record sheet as shown by curves 14 and 15, respectively.

The numerical values recorded on the record sheet are utilized for mathematical computation to determine the particle size x and particle concentration $\phi$ in accordance, for instance, with the following regression formulae $$x = \Sigma a_{ij} I_1^i \cdot (I_2/I_1)^j \quad (3)$$

$$\phi = \Sigma b_{ij} I_1{}^i \cdot (I_2/I_1)^j \quad (4)$$

The above regression formulae are not limited to polynominal formulae such as given by the formulae 3 and 4. Use may also be made of regression formulae which are less in regression error and which can be calculated by a conventional calculating machine with ease. The coefficients $a_{ij}$ and $b_{ij}$ of the regression formulae 3 and 4 are determined such that the values of the particle size and particle concentration measured by another method of calibration are brought into close agreement with the values of the particle size and concentration calculated by the formulae 3 and 4. In such determination of the coefficients, use may be made of the well known method of least squares.

The comparison between the values of the particle size measured by the apparatus shown in FIGS. 2A and 2B according to the regression formula 3 and the measured values of the particle size obtained by the standard sieves is shown in the following Table, columns 6 and 5, respectively.

that the regression formulae 3 and 4 are capable of simplifying the calculation process to be effected by the calculating machine, that the theoretical formulae 1 and 2 would not fit exactly in most cases (because of distributed size, for instance), and that better results are obtained by the use of the regression formulae 3 and 4. This is just the same as in the case of determining the calibration line for spectrophotometric analyzers, atomic absorption analyzers, fluorescent X-ray analyzers, etc.

The method according to the invention has the advantage that the particle size and concentration can be measured on the basis of on-line system in a simple and rapid manner irrespective of the property of the particles and without distinction of dry and wet processes. The regression formula relating to the particle size may be determined by suitably selecting characteristic values for representing the size of particle to be measured such, for example, as average particle diameter, specific surface area, etc. When the size of the particles to be measured is not unique but distributed, it is rather difficult to determine the particle size distribution it- Table

| Test number | Lot of test samples | $I_1$ | $I_2$ | Particle size (Percentage by weight of particles larger than 74 $\mu$) | |
|---|---|---|---|---|---|
| | | | | Measured values obtained by standard sieves | Measured values obtained by the method according to the invention |
| 1 | A | 60.43 | 1.91 | 42.01 | 40.52 |
| 2 | A | 56.06 | 1.90 | 41.89 | 40.62 |
| 3 | A | 57.99 | 2.11 | 42.94 | 44.75 |
| 4 | B | 64.10 | 2.80 | 62.12 | 63.08 |
| 5 | B | 58.93 | 2.59 | 60.59 | 60.08 |
| 6 | B | 65.17 | 2.70 | 61.73 | 58.63 |
| 7 | C | 103.39 | 4.20 | 69.80 | 68.44 |
| 8 | C | 103.28 | 3.98 | 67.40 | 66.87 |
| 9 | C | 103.91 | 4.03 | 68.13 | 67.16 |
| 10 | A | 57.63 | 1.97 | 39.98 | 41.77 |
| 11 | A | 27.56 | 1.45 | 40.38 | 40.66 |
| 12 | B | 101.25 | 3.32 | 59.32 | 58.34 |
| 13 | B | 77.50 | 3.06 | 59.10 | 61.17 |
| 14 | B | 48.05 | 2.27 | 59.57 | 58.55 |
| 15 | C | 142.50 | 4.21 | 66.78 | 66.67 |
| 16 | C | 120.25 | 4.39 | 65.88 | 67.45 |
| 17 | C | 78.25 | 3.40 | 67.22 | 69.27 |

As seen from the above Table, the particle sizes measured by the method according to the invention are approximately equal to those obtained by the standard sieves.

The method according to the invention is suitable for an industrial method of measuring particle size on the basis of on-line system which constitutes a difficult problem in various industrial fields at present. In case of measuring the particle size and concentration by the method according to the invention, the values of the coefficients to be introduced into the calculating machine (such as the coefficients $a_{ij}$, $b_{ij}$, etc. in the formulae 3 and 4) become changed in dependence with the kind and shape of particles, the property of the distribution of the particle size etc., and as a result, it is desirable that the optimum value of the coefficients should be determined beforehand for each case.

As stated hereinbefore, the regression formulae 3 and 4 are used instead of directly obtaining the solution of the theoretical formulae 1 and 2 owing to the fact self. Even in such cases the average particle diameter, etc. can be measured without any trouble. One example of the results thus measured is shown in the above Table.

In the method according to the invention the dimension of the space in which a group of particles to be measured are present can be made considerably larger than the size of one particle constituting the group of particles, and as a result, the apparatus for carrying out the method can easily be manufactured and there is less risk of the measuring part 6 being blocked by the particles.

In fact experimental tests using the apparatus shown in FIG. 2 have yielded favourable results throughout those samples of particles having an average particle diameter of about 5 $\mu$, sample having an average particle diameter of about 120 $\mu$ and a sample of particles whose diameters change from less than 1 $\mu$ to 590 $\mu$.

Heretofore, it has been proposed to measure the particle size of ferromagnetic particles (magnetite) fluidly moving through a pipe. In such conventional method, outside the pipe is arranged a magnetic induction coil across which is induced an electromotive force when the particles pass near the coil and such induced electromotive force is detected so as to measure the particle size. This method, however, has the disadvantage that the particles to be measured are limited to the ferromagnetic particles, that only one of the two factors detected by the method according to the invention, i.e. the factor corresponding to the second factor representing the magnitude of the variable component of the intensity of the penetrated light rays is detected, and as a result, the result measured is liable to be influenced by the particle concentrations, whereby significantly accurate measurement could not be obtained in practical applications in which the particle concentration is more or less variable.

What is claimed is:

1. An apparatus for simultaneously measuring the size and concentration of particles comprising a tank containing liquid in which are suspended the particles to be measured, a measuring unit connected to said tank for receiving said liquid and passing light rays therethrough to produce an electrical output, a filter circuit connected to said measuring unit for separating said electrical output into direct current and alternating current components, and a recorder connected to said filter curcit and provided with a record sheet on which are recorded said direct current and alternating current components, respectively.

2. A method for simultaneously measuring the size and concentration of particles, comprising:
   a. irradiating the particles with a source of radiant energy,
   b. causing relative movement between the particles and the source,
   c. electrically detecting the magnitude of the radiant energy produced by the source as modulated by the relatively moving particles to thereby produce a first electrical signal,
   d. deriving the d.c. component of the first electrical signal,
   e. deriving the a.c. component of the first electrical signal, and
   f. determining the size and concentration of the particles from said d.c. and a.c. component by using the following regression formulae $$x = \Sigma a_{ij} I_1{}^i (I_2/I_1)^j$$
$$\phi = \Sigma b_{ij} I_1{}^i (I_2/I_1)^j$$

where $x$ and $\phi$ are particle size and concentration, respectively, $a_{ij}$ and $b_{ij}$ are predetermined coefficients, $I_1$ and $I_2$ are the d.c. component and the a.c. component of the first electrical signal, respectively.

* * * * *